US012654544B2

(12) United States Patent
Lorenz et al.

(10) Patent No.: US 12,654,544 B2
(45) Date of Patent: Jun. 16, 2026

(54) STIFFENING ELEMENT FOR A LIQUID CONTAINER, LIQUID CONTAINER FOR A MOTOR VEHICLE WITH A STIFFENING ELEMENT AND PRODUCTION METHOD FOR A LIQUID CONTAINER HAVING A STIFFENING ELEMENT

(71) Applicant: Kautex Textron GmbH & Co. KG, Bonn (DE)

(72) Inventors: Harald Lorenz, Bad Neuenahr-Ahrweiler (DE); Daniel Marx, Bedburg (DE); Frank Quant, Königswinter (DE); Klaus Gebert, Willich (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 321 days.

(21) Appl. No.: 18/267,268

(22) PCT Filed: Dec. 16, 2021

(86) PCT No.: PCT/EP2021/086130
§ 371 (c)(1),
(2) Date: Jun. 14, 2023

(87) PCT Pub. No.: WO2022/129302
PCT Pub. Date: Jun. 23, 2022

(65) Prior Publication Data
US 2026/0116180 A1      Apr. 30, 2026

(30) Foreign Application Priority Data
Dec. 16, 2020    (DE) ..................... 10 2020 133 769.8

(51) Int. Cl.
*B60K 15/03*          (2006.01)

(52) U.S. Cl.
CPC .................. *B60K 15/03177* (2013.01); *B60K 2015/03032* (2013.01); *B60K 2015/03493* (2013.01)

(58) Field of Classification Search
CPC .... B60K 15/03177; B60K 2015/03032; B60K 2015/03493
See application file for complete search history.

(56) References Cited

U.S. PATENT DOCUMENTS

| | | | |
|---|---|---|---|
| 6,338,420 B1 | 1/2002 | Pachciarz et al. | |
| 2012/0152449 A1* | 6/2012 | Watanabe | B29C 66/1312 156/245 |

(Continued)

FOREIGN PATENT DOCUMENTS

| | | |
|---|---|---|
| CN | 104884292 A | 9/2015 |
| CN | 105658462 A | 6/2016 |

(Continued)

OTHER PUBLICATIONS

International Preliminary Report on Patentability in PCT/EP2021/086130 dated Aug. 25, 2022 (5 pages).

(Continued)

*Primary Examiner* — Stephen J Castellano
(74) *Attorney, Agent, or Firm* — Young Basile Hanlon & MacFarlane, P.C.

(57) ABSTRACT

The invention relates to a stiffening element for a liquid container for a motor vehicle and to a liquid container comprising such a stiffening element, wherein the stiffening element has a first connection area, a second connection area and a central area, wherein the first connection area and the second connection area are at least indirectly connected to one another by the central area, and wherein the first connection area and the second connection area have a different connection geometry. Furthermore, the invention (Continued)

Figure 1:
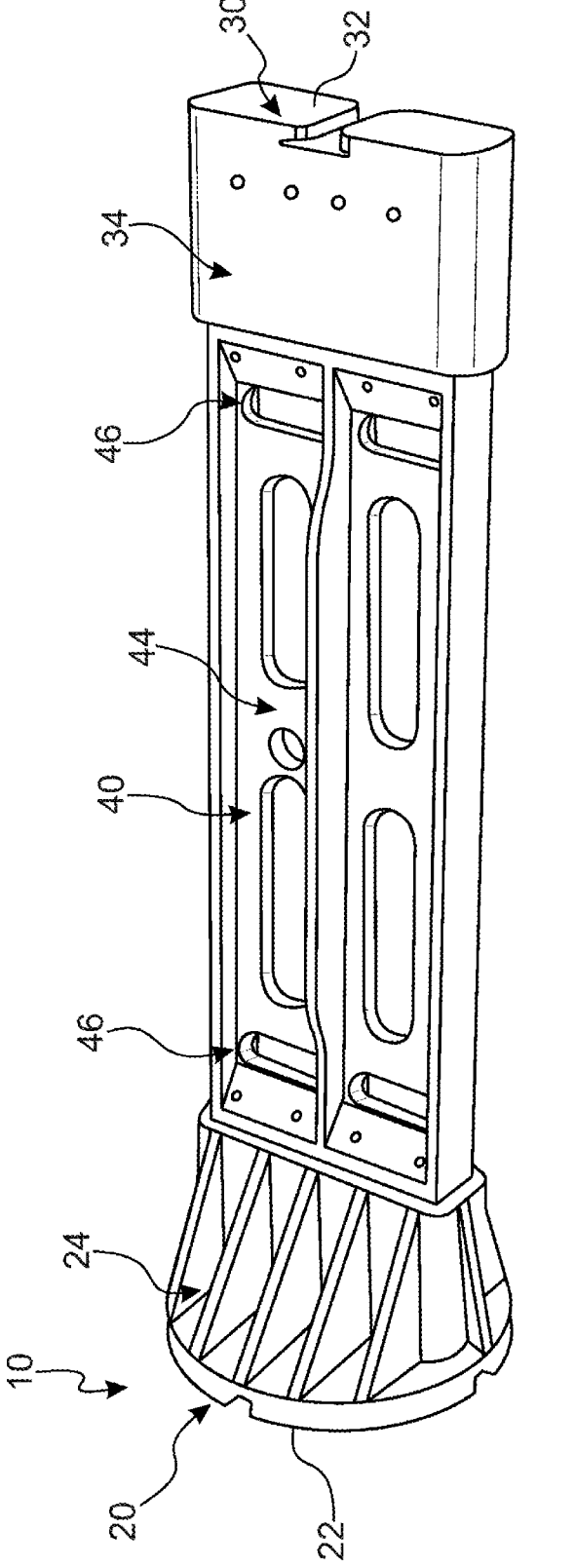

relates to a method for the production of such a liquid container.

19 Claims, 2 Drawing Sheets

(56)                    References Cited

U.S. PATENT DOCUMENTS

| | | | |
|---|---|---|---|
| 2015/0232226 A1* | 8/2015 | Heidemeyer | .......... B65D 25/24 |
| | | | 220/652 |
| 2015/0344183 A1 | 12/2015 | Quant et al. | |
| 2018/0311880 A1 | 11/2018 | Sun et al. | |
| 2021/0237558 A1 | 8/2021 | Liu et al. | |

FOREIGN PATENT DOCUMENTS

| | | |
|---|---|---|
| DE | 102005054179 A1 | 5/2006 |
| DE | 102017001763 A1 | 8/2018 |
| JP | 201671311 A | 5/2016 |

OTHER PUBLICATIONS

International Search Report, PCT Application No. PCT/EP2021/086130, mailed Apr. 5, 2022 (4 pages).
First Office Action, Chinese Application No. 202180085185.9, mailed Jan. 10, 2026 (12 pages).

* cited by examiner

STIFFENING ELEMENT FOR A LIQUID CONTAINER, LIQUID CONTAINER FOR A MOTOR VEHICLE WITH A STIFFENING ELEMENT AND PRODUCTION METHOD FOR A LIQUID CONTAINER HAVING A STIFFENING ELEMENT

CROSS REFERENCE TO RELATED APPLICATIONS

This application is a 371 national stage application of International Application No. PCT/EP2021/086130, filed Dec. 16, 2021, which claims the benefit of the filing date of German Application No. 10 2020 133 769.8, filed Dec. 16, 2020, the contents of which are hereby incorporated by reference in their entireties.

The invention relates to a stiffening element for a liquid container, a liquid container for a motor vehicle having such a stiffening element, and a manufacturing method for a liquid container having a stiffening element.

Stiffening elements for liquid containers are used to keep the liquid container in shape and stiffen it under static and dynamic operating loads in a motor vehicle. Particularly in the case of liquid containers composed of two half-shells, stiffening elements serve to structurally reinforce the container. On the one hand, there is the requirement that the stiffening elements should be as light as possible in order to keep the overall weight of the liquid container low. Furthermore, a reliable connection between the stiffening element and usually multi-layer inner walls of the container is to be produced.

The object of the invention is that of providing an improvement over or an alternative to the prior art.

According to a first aspect of the invention, the object solves a stiffening element for a liquid container for a motor vehicle, wherein the stiffening element has a first connection area, a second connection area, and a central area, wherein the first connection area and the second connection area are at least indirectly connected to one another by the central area, wherein the first connection area and the second connection area have a different connection geometry, and wherein a first connection surface of the first connection area is larger than a connection surface of the second connection area.

In this regard, the following is explained conceptually:

First of all, it should be expressly pointed out that in the context of the present patent application indefinite articles and numerical indications such as "one", "two", etc. are as a rule to be understood as "at least" indications, i.e. as "at least one . . . ", "at least two . . . ", etc., unless it is expressly clear from the respective context or it is obvious or technically imperative to the person skilled in the art that only "exactly one . . . ", "exactly two . . . ", etc. can be meant there.

In the context of the present patent application, the expression "in particular" should always be understood as introducing an optional, preferred feature. The expression should not be understood to mean "specifically" or "namely."

A "stiffening element" is understood to mean a structural element which is intended for use in a liquid container and is configured in a designated manner to stiffen the liquid container. In particular, a stiffening element can transmit tensile forces and pressure forces. Preferably, a stiffening element is configured to maintain opposing walls of an internally printed liquid container at a distance substantially defined by the longitudinal extent of the stiffening element with respect to underpressure or overpressure with respect to the surrounding, thereby stiffening the liquid container. Overall, a stiffening element minimizes deformation of a liquid container in the event of overpressure inside the liquid container and/or underpressure inside the liquid container.

A "connection area" is an area of the stiffening element that is configured for connection, particularly for material connection, to the liquid container. In particular, a stiffening element has a first connection area and a second connection area opposite in the longitudinal direction of the stiffening element. Preferably, the first connection area and the second connection area are formed of a fabric that is materially compatible with the designated fabric of the liquid container such that welding is possible at these designated contact areas. Preferably, the first and second connection areas are made of HDPE (high-density polyethylene).

A "central area" is understood to be the area of the stiffening element between the first connection area and the opposite second connection area.

It should be expressly noted that the central area, first connection area, and second connection area identify portions of the stiffening element. The central area, first connection area and second connection area can be different components, but alternatively they can be monolithically formed with one another.

A "connection geometry" means the geometry of a connection area, wherein the connection geometry has a "connection surface" that is configured in a designated manner for connection, in particular for material bonding, between the connection area and the designated liquid container.

The liquid container may be a fuel tank, for example.

The liquid container may be a container for storing urea solution for an SCR catalyst.

The liquid container can be a container for storing cooling liquid, for example for cooling an engine or a battery.

The liquid container may have a multi-layer wall construction. For example, a sandwich or layered structure of a wall of the liquid container may have a layer that provides a diffusion barrier for a liquid to be stored. Such a diffusion barrier can, for example, be enclosed on two sides by at least two further layers.

Stiffening elements are preferably connected in series to the walls of the designated liquid container or its preform, wherein the weight of the stiffening element is temporarily suspended from a connection area of the stiffening element, in particular from the first connection area, wherein the stiffening element is oriented with its longitudinal extension direction substantially transverse to the direction of gravity in particular, such that there is also a moment load at the first connection area. This can cause the stiffening element to tilt, such that the orientation of the stiffening element no longer corresponds to its desired orientation. This can also cause unwanted deformation of the designated liquid container and/or its preform in the area of the connection.

Here, an optimized stiffening element is proposed which has a larger connection area at its first connection area than at its second connection surface and thus an overall different geometry of the first connection area to the second connection area.

In the manufacturing process of the designated liquid container, it is provided that the stiffening element proposed herein is first connected to the first connection area with the larger surface. The larger connection area makes the connection less susceptible to the force and particularly the torque introduced by the weight of the stiffening element, thus reducing or preventing the stiffening element from tilting.

The second connection area is smaller, which means that it can also be designed with a lower weight. This can also reduce or prevent any tilting of the stiffening element. Thus, an asymmetrical design of the connection areas acts synergistically to reduce or prevent stiffening element tipping.

In experiments, it was surprisingly shown that an enlarged first connection area also allows simplification of the process for production of a designated liquid container, since the enlarged first connection surface allows the stiffening element to be more stably and/or easily connected to the designated liquid container or its preform, and also eliminates the need for a separate active heating element for the first connection area and an associated mimic. Thus, less space is required in the central frame for components, allowing even smaller liquid containers to be equipped with a stiffening element proposed here.

Furthermore, the enlarged first connection surface leads to the fact that stiffening elements with a larger longitudinal extension can be applied, since these now no longer exceed a maximum permissible tilting, so that even larger liquid containers can be stiffened with the stiffening element proposed here and/or the potential filling volume of the designed liquid container can increase, particularly since a flower pot (wall indentation for welding) can be dispensed with at least on one side.

Suitably, an area ratio of the first connection surface to the second connection surface lies in an area between 1.1 and 3.5, preferably in an area between 1.2 and 2.9, and particularly preferably in an area between 1.3 and 2.5.

In this regard, the following is explained conceptually:

"Area ratio from the first connection surface to the second connection surface" means the ratio of the areas of the first connection surface to the second connection surface, wherein the ratio has the area of the first connection surface in the numerator and the surface of the second connection surface in the denominator.

Preferably, the lower limit for the surface ratio area is 1.4, more preferably 1.5, and most preferably 1.6.

Preferably, the upper limit for the surface ratio area is 2.8, more preferably 2.7, and most preferably 2.6.

It should be explicitly noted that the individual area boundaries elaborated above can be linked individually or cumulatively without leaving the object of this aspect.

Experiments have shown that the above area ratios result in a particularly advantageous design of the stiffening element proposed here.

It should be expressly noted that the above values for the range limits of the area ratio are not intended to be sharp limits, but rather are intended to be capable of being exceeded or undercut on an engineering scale without departing from the aspect of the invention described. In simple terms, the values are intended to provide a guide to the size of the area ratio range proposed here.

Particularly preferably, the first connection surface radially symmetrical.

Experiments have shown that stiffening elements with a radially symmetrical first connection surface are particularly advantageous, since tilting of the stiffening element after connecting the first connection area and before connecting the second connection area to the designated liquid container or its designated preform can be particularly well reduced or even prevented. Among other things, this also allows a stiffening element to have a greater longitudinal extension, so that larger liquid containers can also be produced more easily and cost-effectively.

In accordance with a particularly useful embodiment, the first connection area has welding pins.

In this regard, the following is explained conceptually:

A "welding pin" is understood to be a pin-shaped projecting area of a connection area. Preferably, a welding pin has a diameter between 1.0 mm and 3.5 mm, more preferably a diameter between 1.5 mm and 3.0 mm, and most preferably a diameter between 1.9 mm and 2.6 mm. Preferably, a welding pin has an angular base surface, in particular a rectangular base surface and/or a square base surface or a base surface in the form of a polygon. Preferably, a welding pin has a transverse extension of between 0.5 mm and 3.0 mm, more preferably a transverse extension of between 0.8 mm and 2.4 mm, and most preferably a transverse extension of between 1.2 mm and 1.8 mm. Preferably, a welding pin has a longitudinal extension of greater than or equal to 0.7 and less than or equal to 1.5 diameters or transverse extensions of the welding pin, more preferably a longitudinal extension of greater than or equal to 0.8 and less than or equal to 1.35 diameters or transverse extensions of the welding pin, and most preferably a longitudinal extension of greater than or equal to 0.9 and less than or equal to 1.1 diameters or transverse extensions of the welding pin. A welding pin is preferably arranged in a regular pattern with other welding pins on a connection area. Welding pins are configured to increase the surface area of the connection area, whereby on the one hand a larger surface area can be achieved for an adhesive connection between the designated joining partner, in particular a wall of a liquid container, and the connection area, so that after a frictional connection has been achieved, a greater force can be transmitted between the connection area and the designated joining partner. On the other hand, the increased surface of the connection area in conjunction with the comparatively large ratio of the surface of a welding pin to the volume of a welding pin enables a connection area, in particular one or more welding pins, to be softened more easily from the first heat of the designated joining partner, and thus a material-to-material connection between the connection area and the designated joining partner can be achieved. In other words, a welding pin is configured to support a force-fit and/or a material-fit connection between the connection area and the designated joining partner, so that higher forces can be transmitted between the connection area and the designated joining partner after cooling.

Here, a stiffening element is proposed which is designed in such a manner that it does not have to be actively heated at both connection areas for connection to the designated liquid container, in particular for material-locking connection. In particular, the welding pins on the first connection area proposed here can be achieved in such a manner that they can be connected, in particular welded, to the designated liquid container or the preform merely by the passive first heat of the wall of the designated liquid container or of the preform used for production of the designated liquid container. In other words, active heating of the first connection area can be dispensed with, which also means that a corresponding heating element and the mechanics required for this can be dispensed with, and which means that the space required in a central frame for attaching the stiffening element can be reduced overall. This also allows smaller liquid containers to be welded with such a stiffening element.

Due to the larger first connection surface of the first connection area compared to the second connection surface, it is also possible to maintain the desired connection strength compared to a material-locking connection with a smaller connection surface that is actively heated, in particular the second connection surface of the second connection area.

Optionally, the second connection surface has two symmetry axes, wherein the second connection area extends longer along the first symmetry axis than along the second symmetry axis.

Experiments have shown that a second connection area can be designed particularly advantageously if it has two symmetry axes, in particular a square basic shape, a rectangular basic shape, an elliptical basic shape, a circular basic shape or a mixture of at least two aforementioned basic shapes.

This allows the second connection area to be particularly advantageously adapted to the designated operating loads occurring in the designated liquid container, thereby reducing the weight of the stiffening element.

In accordance with a preferred embodiment, the second connection surface has a recess with an undercut.

The recess in the second connection surface, in particular in combination with an undercut of the recess, permits a frictional and/or form closure between the second connection area and the designated liquid tank or its preform, in particular because of the mutual penetration of the components. This can optionally support a substance-to-substance connection.

In accordance with a preferred embodiment, the first connection area is had by a first connection piece, the second connection area is had by a second connection piece, and the central area is had by a central piece, wherein the central piece is frictionally and/or positively connected to the first connection piece and the second connection piece.

In this regard, the following is explained conceptually:

A "connection piece" is understood to mean a component of a stiffening element which has a connection area. A first connection piece is thereby configured to be connected to a "central piece" of the stiffening element, in particular to be connected non-positively and/or form closure, while a second connection piece is configured to be connected to the central piece on the opposite side of the first connection piece, in particular to be connected non-positively and/or form closure. Preferably, a central piece forms a stiffening element together with two connecting pieces. Preferably, a central piece has one or more struts. Preferably, a central piece is plate-like in design and/or has stiffening cross-ribs.

The multi-component method proposed here, allows the use of different materials for the connection pieces and the central piece. Thus, the stiffening elements can be adapted in terms of material to a material-locking connection with the designated liquid container or its preform, while the central piece can be made of a material with a higher tensile strength, which allows the weight of the stiffening element to be reduced, particularly in the area of the central piece, in order to ensure resistance to fracture with respect to the designated operating loads.

Thus, a section-by-section optimization of the stiffening element can be achieved.

Preferably, the central piece is made of PA (polyamide), PAI (polyamide imide), PEEK polyetheretherketone), PPA (polyphtalamide), PBT (polybutylene terephthalate), POM (polyoxymethylene) or PPS (polyphenylene sulfide).

Advantageously, a particularly good ratio between tensile strength and density of the central piece can be achieved.

Particularly expediently, the stiffening element has a longitudinal extension of greater than or equal to 100 mm.

Preferably, the stiffening element has a longitudinal extension greater than or equal to 90 mm, preferably greater than or equal to 110 mm, and more preferably greater than or equal to 120 mm.

Preferably, the stiffening element has a longitudinal extension of greater than or equal to 140 mm, preferably greater than or equal to 160 mm, and more preferably greater than or equal to 180 mm. Further preferably, the stiffening element has a longitudinal dimension greater than or equal to 190 mm, preferably greater than or equal to 200 mm, and more preferably greater than or equal to 220 mm.

It should be expressly noted that the above values for the longitudinal extent of the stiffening element are not intended to be sharp limits, but rather are intended to be capable of being exceeded or undershot on an engineering scale without departing from the aspect of the invention described. In simple terms, the values are intended to provide an indication of the size of the longitudinal extension of the stiffening element proposed here.

In accordance with a preferred embodiment, the central area and/or central piece has a predetermined breaking point.

In this regard, the following is explained conceptually:

A "predetermined breaking point" is understood to be a particular design of a defined location that is configured to break predictably under a defined load.

This can be used to ensure that the stiffening element fails in a controlled manner in the event of an overload. In this manner, a designated liquid container can be prevented from leaking under smaller loads that cause the predetermined breaking point to fail.

Optionally, the central area and/or central piece has at least one through-opening.

In this regard, the following is explained conceptually:

A "through-opening" is understood to mean a material recess within the stiffening element. Preferably, a through-opening is configured to act as a predetermined breaking point and/or to be flowed through by a designated liquid in the designated liquid container and/or to act as a connecting means with an attachable member attachable to the stiffening element.

This allows a designated liquid in the designated liquid container to flow through the stiffening element, thereby reducing the designated operating loads on the stiffening element.

Furthermore, the through-openings make it easy to attach add-on parts to the stiffening element, approximately the attachment of noise barriers, so that a functional integration for the stiffening element can be achieved.

It is convenient to have a pull-off force between the central piece and the first connecting piece and a pull-off force between the central piece and the second connecting piece are greater than or equal to 7 kN.

In this regard, the following is explained conceptually:

A "pull-off force" is understood to be the tensile force that must be applied in order to detach two components, in particular a connection piece and a central piece, from one another, in particular by means of a pulling machine, preferably having a pulling speed of 50-100 mm/min. Loosening can be caused on the one hand by breakage and on the other hand by loosening of a force-locking and/or form closure connection.

Preferably, the pull-off force is greater than or equal to 8 kN, more preferably greater than or equal to 9 kN, and most preferably greater than or equal to 10 kN.

Preferably, the pull-off force is greater than or equal to 12 kN, more preferably greater than or equal to 15 kN, and most preferably greater than or equal to 18 kN.

Advantageously, this means that the specifications for the load-bearing capacity of a stiffening element can be met.

It should be expressly noted that the above values for pull-off force are not intended to be sharp limits, but rather are intended to be capable of being exceeded or undercut on an engineering scale without departing from the aspect of the invention described. In simple terms, the values are intended to provide a guide to the magnitude of the pull-off force proposed here.

Particularly preferably, the tensile strength of the central piece exceeds the tensile strength of the first connection piece and/or the second connection piece by a factor of 3 or less, wherein the tensile strength can be determined according to DIN EN ISO 527.

Preferably, the tensile strength of the central piece exceeds the tensile strength of the first connection piece and/or the second connection piece by a factor of 2.8 or less, preferably by a factor of 2.6 or less, and more preferably by a factor of 3.2 or less.

This can advantageously ensure that the corresponding specification for a secure connection between the central piece and the connection piece can be maintained even with different material properties.

It should be expressly noted that the above values for the ratio of tensile strengths are not intended to be sharp limits, but rather are intended to be capable of being exceeded or undercut on an engineering scale without departing from the aspect of the invention described. In simple terms, the values are intended to provide an indication of the size of the area of the ratio of tensile strengths proposed here.

According to a second aspect of the invention, the object solves a liquid container for a motor vehicle, comprising a stiffening element according to the first aspect of the invention, wherein the stiffening element is arranged in an interior space of the liquid container.

It is understood that the advantages of a stiffening element for a liquid container according to the first aspect of the invention as described above extend directly to a liquid container having a stiffening element according to the first aspect of the invention.

It should be expressly noted that the subject matter of the second aspect can advantageously be combined with the subject matter of the preceding aspect of the invention, both individually or cumulatively in any combination.

According to a third aspect of the invention, the object solves a method of production of a liquid container for a motor vehicle having a stiffening element according to the first aspect of the invention, comprising the following steps:
    forming of a preform;
    inserting the preform into a molding open cavity;
    inserting the stiffening element;
    material-locking connection of the first connection area of the stiffening element to the preform, wherein the material-locking connection is effected with the first heat of the preform;
    heating the second connection area of the stiffening element with a heating element;
    material-locking connection of the preform, in particular by closing the molding cavity, and molding of the connected preform into the liquid container;
    material-locking connection of the second connection area to the preform or liquid container.
In this regard, the following is explained conceptually:
A "preform" is understood to be a body produced by injection molding in a preceding work step, which is configured to be formed into a liquid container during a blow molding process. A preform can have different geometries, approximately two flat geometries oriented parallel to one another, two I-shaped geometries oriented substantially parallel to one another, or a C-shaped geometry.

The "first heat" is understood to be the heat energy that the preform has when it is introduced into the molding cavity. In particular, the preform is still warm enough from the initial heat it exhibits that it has not yet crystallized. In particular, the first heat denotes the heat minus the process losses occurring due to thermal radiation and/or convection with which the preform is demolded by the injection molding machine.

A "heating element" is understood to mean any apparatus by means of which heat can be supplied to the preform and/or the stiffening element, in particular to the second connection area. In particular, a heating element is an infrared emitter. In particular, a heating element is an electrical resistor through which current flows during operation.

Herein, a manufacturing method is proposed that takes advantage of the benefits enabled by the stiffening element according to the first aspect of the invention and can thereby provide further benefits.

It should be expressly noted that the proposed method steps can also be run through in a different sequence, insofar as this is useful to the person skilled in the art, or can be partially carried out in parallel with one another without departing from the aspect of the invention proposed here.

Preferably, the stiffening element is inserted between the preform of the designated fuel tank by means of a central frame.

Preferably, the material-locking connection of the preform and/or the forming of the preform into the liquid container and the material-locking connection of the second connection area to the designated liquid container or its preform are performed simultaneously.

It is understood that the advantages of a stiffening element for a liquid container according to the first aspect of the invention as described above extend directly to a method of production of a liquid container comprising a stiffening element according to the first aspect of the invention.

It should be expressly noted that the subject matter of the third aspect can advantageously be combined with the subject matter of the preceding aspects of the invention, both individually and cumulatively in any combination.

Further advantages, details and features of the invention can be found below in the described embodiments. In the drawings, in detail:
FIG. 1: shows a stiffening element in a perspective view; and
FIG. 2: shows schematically a stiffening element connected to a liquid container shown in segments.

In the following description, the same reference signs denote the same components or features; in the interest of avoiding repetition, a description of a component made with reference to one drawing also applies to the other drawings. Furthermore, individual features that have been described in connection with one embodiment can also be used separately in other embodiments.

The stiffening element (10) for a liquid container (12) for a motor vehicle in FIG. 1 substantially comprises a first connection area (20), a second connection area (30) and a central area (40), wherein the first connection area (20) and the second connection area (30) are at least indirectly connected to one another by the central area (40), wherein the first connection area (20) and the second connection area (30) have a different connection geometry, and wherein a first connection area (22) of the first connection area (20) is larger than a second connection area (32) of the second connection area (30).

The stiffening element (10) in FIG. 1 is configured by means of a plurality of components, wherein the first connection area (20) is by means of a first connection piece (24), wherein the second connection area (30) is by means of a second connection piece (34), and wherein the central area (40) is by means of a central piece (44), wherein the central piece (44) is connected to the first connection piece (24) and the second connection piece (34) in a force-fit and/or form-fit manner.

The central piece 44 has two predetermined breaking points 46, which are configured for controlled failure of the stiffening element 10.

The central piece 44 has a plurality of through-openings (not identified) that can be traversed by a designated liquid within the designated liquid container 12 (FIG. 2), thereby contributing to a reduction in operating loads on the stiffening element 10.

Furthermore, the through-openings allow attachments (not shown) to be attached to the stiffening element 10 in a simple manner.

The first connection piece 24 has laterally extending transverse ribs (not identified) that increase the stiffness of the connection piece 24 while maintaining a low additional weight.

Figure 2:
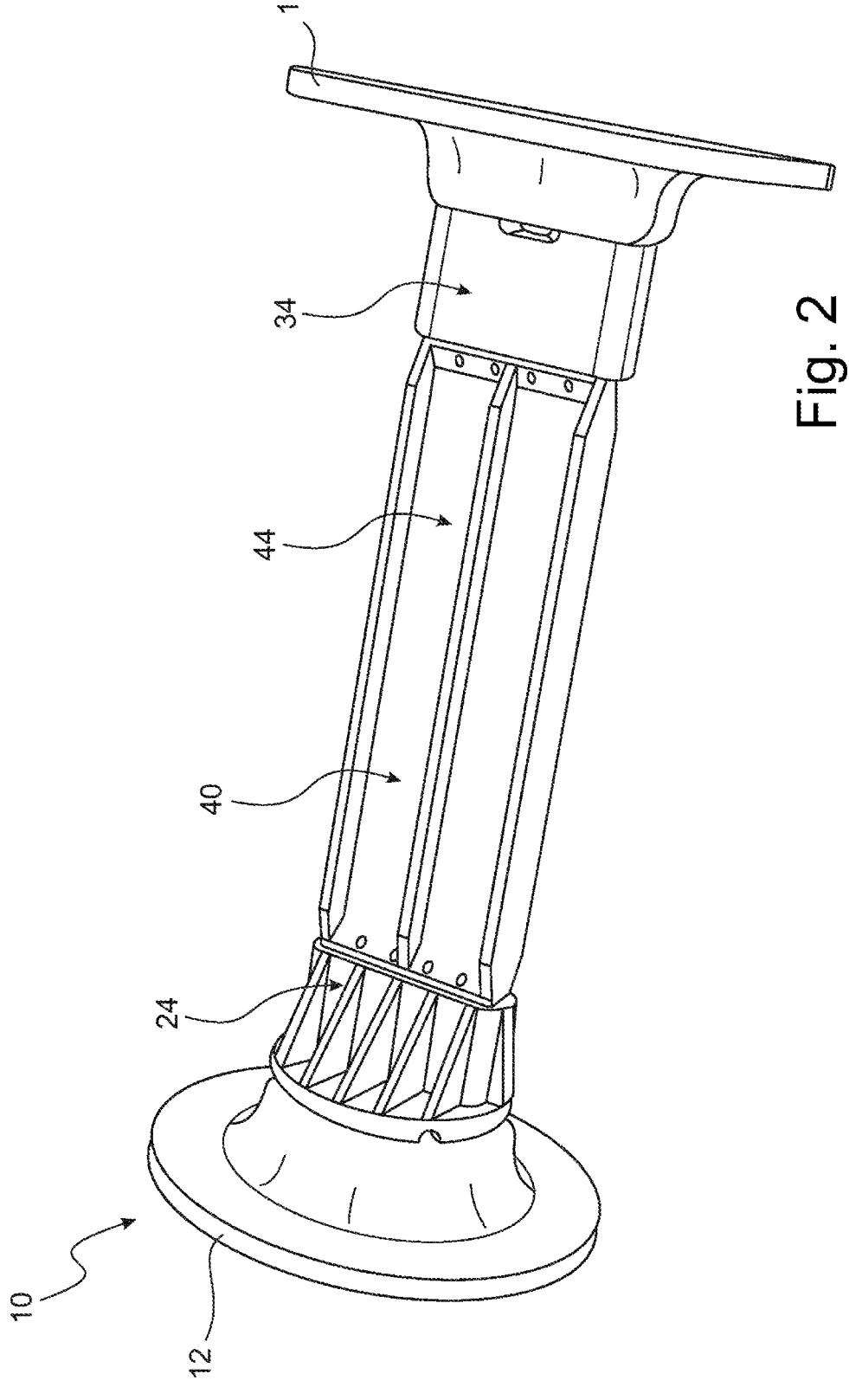

The stiffening element 10 in FIG. 2 is already inserted into its designated liquid container 12, which is shown schematically by the areas of the liquid container 12 adjacent to the connection pieces 24, 34.

The first connection piece 24 is materially connected to the liquid container 12. The second connection piece 34 is materially connected to the liquid container 12.

LIST OF REFERENCE SIGNS 10 stiffening element
12 liquid container
20 first connection area
22 first connection surface
24 first connection piece
30 second connection area
32 second connection surface
34 Second connection piece
40 central area
44 central piece
46 predetermined breaking point

The invention claimed is:

1. A stiffening element for a liquid container for a motor vehicle, wherein the stiffening element has a first connection area, a second connection area, and a central area, wherein the first connection area and the second connection area are at least indirectly connected to one another by the central area, wherein the first connection area and the second connection area have a different connection geometry and wherein a first connection surface of the first connection area is larger than a second connection surface of the second connection area, wherein the first connection area is had by a first connection piece, the second connection area is had by a second connection piece, the central area is had by a central piece, wherein the central piece is connected to the first connection piece and the second connection piece in a force-fitting manner, and the central piece has at least one through-opening.

2. The stiffening element according to claim 1, wherein an area ratio from the first connection surface to the second connection surface is in an area between 1.1 and 3.5.

3. The stiffening element according to claim 1, wherein the first connection surface is radially symmetrical.

4. The stiffening element according to claim 1, wherein the first connection area has welding pins.

5. The stiffening element according to claim 1, wherein the second connection surface has two symmetry axes, wherein the second connection area extends longer along a first symmetry axis than along a second symmetry axis.

6. The stiffening element according to claim 1, wherein the second connection surface has a recess with an undercut.

7. The stiffening element according to claim 1, wherein the central piece is made of PA (polyamide), PAI (polyamide imide), PEEK (polyetheretherketone), PPA (polyphtalamide), PBT (polybutylene terephthalate), POM (polyoxymethylene) or PPS (polyphenylene sulfide).

8. The stiffening element according to claim 1, wherein the stiffening element has a longitudinal extension greater than or equal to 100 mm.

9. The stiffening element according to claim 1, wherein a pull-off force between the central piece and the first connection piece and a pull-off force between the central piece and the second connection piece are greater than or equal to 7 kN.

10. The stiffening element according to claim 1, wherein a tensile strength of the central piece exceeds the tensile strength of the first connection piece and/or the second connection piece by a factor of 3 or less.

11. A liquid container for a motor vehicle, comprising a stiffening element according to claim 1, wherein the stiffening element is arranged in an interior space of the liquid container.

12. The stiffening element according to claim 1, wherein an area ratio from the first connection surface to the second connection surface is in an area between 1.2 and 2.9.

13. The stiffening element according to claim 1, wherein an area ratio from the first connection surface to the second connection surface is in an area between 1.3 and 2.5.

14. The stiffening element according to claim 1, wherein the first connection piece, the second connection piece, and the central piece are separate pieces.

15. The stiffening element according to claim 14, wherein the central piece is connected to the first connection piece by a friction connection.

16. The stiffening element according to claim 1, wherein the central area and/or the central piece has a predetermined breaking point.

17. The stiffening element according to claim 16, wherein the predetermined breaking point is configured to fail at a predetermined load.

18. The stiffening element according to claim 16, wherein the predetermined breaking point comprises one or more openings the central piece configured to cause the central piece to break predictably.

19. A stiffening element for a liquid container for a motor vehicle, wherein the stiffening element has a first connection area, a second connection area, and a central area, wherein the first connection area and the second connection area are at least indirectly connected to one another by the central area, wherein the first connection area and the second connection area have a different connection geometry and wherein a first connection surface of the first connection area is larger than a second connection surface of the second connection area,

US 12,654,544 B2

11 wherein
  the first connection area is had by a first connection
    piece,
  the second connection area is had by a second connec-
    tion piece,
  the central area is had by a central piece, wherein the
    central piece is connected to the first connection
    piece and the second connection piece in a force-
    fitting and/or form-fitting manner, and
  the central piece has at least one through-opening,
wherein the central area and/or the central piece has a
  predetermined breaking point.

\* \* \* \* \*